(12) United States Patent
Adachi et al.

(10) Patent No.: US 7,565,162 B2
(45) Date of Patent: Jul. 21, 2009

(54) WIRELESS COMMUNICATION SYSTEM AND WIRELESS STATION

(75) Inventors: Tomoko Adachi, Urayasu (JP); Kuniaki Ito, Kawasaki (JP); Hideo Kasami, Kawasaki (JP); Kiyoshi Toshimitsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 564 days.

(21) Appl. No.: 11/257,042

(22) Filed: Oct. 25, 2005

(65) Prior Publication Data

US 2006/0040709 A1    Feb. 23, 2006

Related U.S. Application Data

(62) Division of application No. 10/212,242, filed on Aug. 6, 2002, now Pat. No. 6,983,167.

(30) Foreign Application Priority Data

Aug. 7, 2001   (JP)   ............................... 2001-239198

(51) Int. Cl.
*H04B 7/00*  (2006.01)

(52) U.S. Cl. ...................... 455/522; 455/69; 455/422.1; 455/456.1; 455/500; 455/524; 370/338; 370/349; 370/395.5; 370/332; 370/345

(58) Field of Classification Search .................. 455/69, 455/522, 522.1, 127.1, 422.1, 456.1, 524; 370/338, 349, 395.5, 332, 345

See application file for complete search history.

(56) References Cited

U.S. PATENT DOCUMENTS

| | | | |
|---|---|---|---|
| 5,815,811 | A | 9/1998 | Pinard et al. |
| 5,960,350 | A | 9/1999 | Schorman et al. |
| 6,002,918 | A | 12/1999 | Heiman et al. |
| 6,311,075 | B1 | 10/2001 | Bevan et al. |
| 6,415,163 | B1 * | 7/2002 | Keskitalo et al. ......... 455/562.1 |
| 6,947,768 | B2 | 9/2005 | Adachi et al. |
| 2001/0031647 | A1 * | 10/2001 | Scherzer et al. ............. 455/562 |
| 2002/0181492 | A1 | 12/2002 | Kasami et al. |
| 2003/0214928 | A1 | 11/2003 | Chuah |

OTHER PUBLICATIONS

U.S. Appl. No. 11/257,042, filed Oct. 25, 2005, Adachi et al.
Y-B, Ko, et al., Infocom, Nineteenth Annual Joint Conference of the IEEE Computer and Communications Societies, XP-010376001, pp. 13-21, "Medium Access Control Protocols Using Directional Antennas in Ad Hoc Networks", Mar. 26, 2000.

* cited by examiner

*Primary Examiner*—Matthew D Anderson
*Assistant Examiner*—Adel Youssef
(74) *Attorney, Agent, or Firm*—Oblon, Spivak, McClelland, Maier & Neustadt, P.C.

(57) ABSTRACT

A station determines the presence/absence of directional beam control in an access point, on the basis of received power measured when data transmitted from the access point are received, and the type of the received data. In accordance with the result of this determination, the station controls transmitting power to transmit data to the access point.

22 Claims, 10 Drawing Sheets

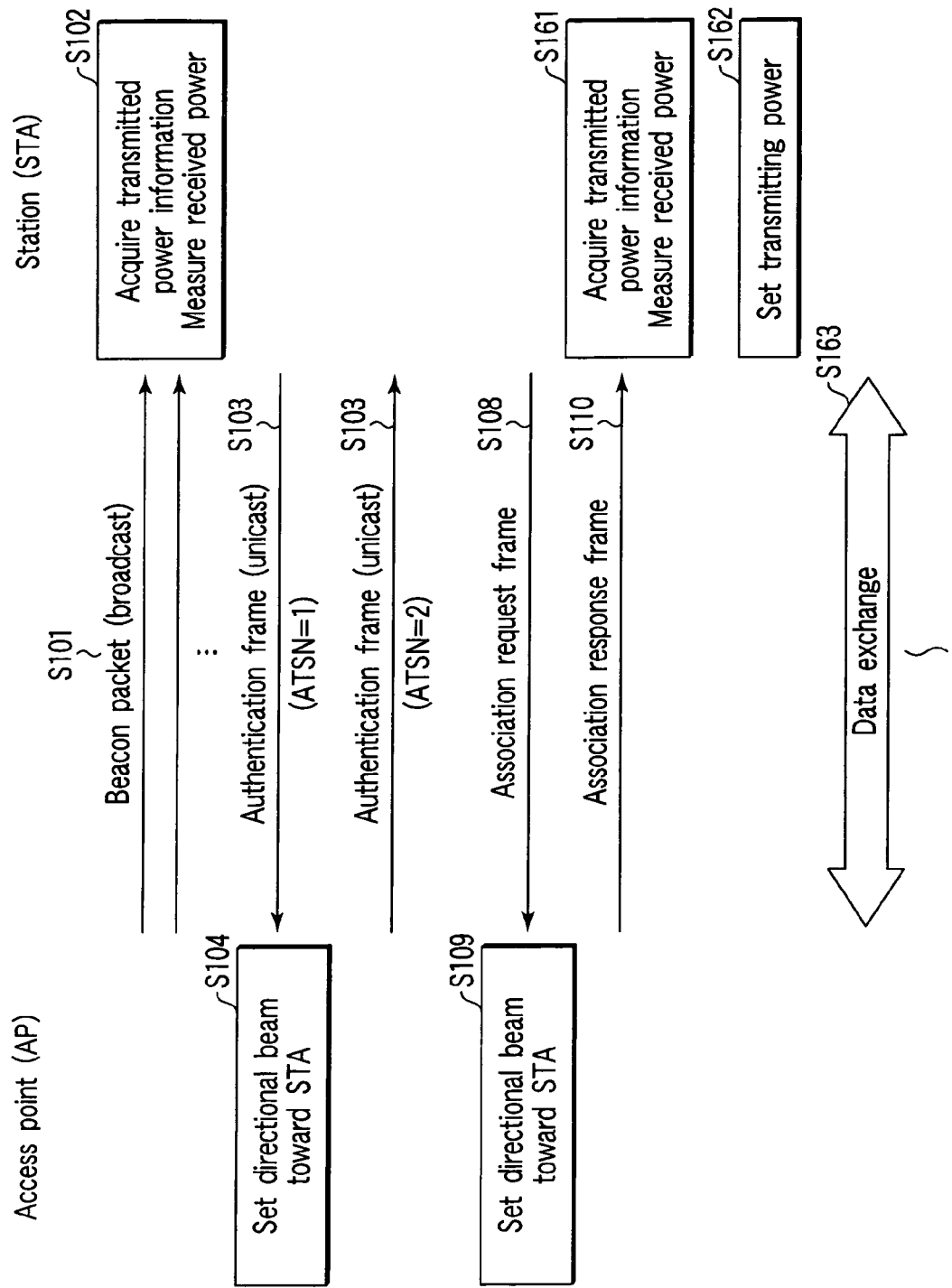
F I G. 10

WIRELESS COMMUNICATION SYSTEM AND WIRELESS STATION

CROSS-REFERENCE TO RELATED APPLICATIONS

This application is a divisional of U.S. application Ser. No. 10/212,242 filed Aug. 6, 2002, and is based upon and claims the benefit of priority from the prior Japanese Patent Application No. 2001-239198, filed Aug. 7, 2001, the entire contents of each of which are incorporated herein by reference.

BACKGROUND OF THE INVENTION

1. Field of the Invention

The present invention relates to a wireless communication system useful in a wireless LAN for performing communication by space division multiplexing, and a wireless station included in this system.

2. Description of the Related Art

A wireless LAN system based on IEEE 802.11 (ISO/IEC 8802-11:1999(E) ANSI/IEEE Std 802.11, 1999 edition) using CSMA (Carrier Sense Multiple Access) is known. This wireless LAN system can consist of plural stations and at least one access point. A station performs carrier sensing before transmitting a packet to the access point. This carrier sensing includes physical carrier sensing and virtual carrier sensing. Physical carrier sensing checks whether a wireless medium is busy or idle, from a received signal level. Virtual carrier sensing checks whether a wireless medium is busy or idle, from reservation information contained in a received signal.

The station performs carrier sensing and postpones packet transmission, starts connecting to the access point, or transmits the packet. That is, when a reception level of a signal is larger than a certain threshold value or when a packet containing channel reservation information (NAV (ISO/IEC 8802-11:1999(E) ANSI/IEEE Std 802.11, 1999 edition)) is received from another station or access point, the station postpones packet transmission and when the wireless communication medium becomes idle after the elapse of a random transmission backoff time, the station starts connecting to the access point. When the station is already connected to the access point, the station transmits a packet in which the address of the access point is designated without waiting random time.

SDMA (Space Division Multiple Access) is known as one multiplexing method in a wireless communication system. SDMA is implemented at an access point by using an adaptive array antenna. The adaptive array antenna forms plural antenna beams which reduce interference between them. This improves the communication quality and realizes simultaneous communication between an access point and plural stations.

It is presumably possible to achieve similar advantages by applying this SDMA to a wireless LAN system based on CSMA.

If, however, SDMA is simply applied to a CSMA wireless LAN system, the following problem arises.

Generally, a station does not have a directional antenna such as an adaptive array antenna. Therefore, while a certain station is transmitting a packet to an access point, another station determines by the carrier sense function described above that the wireless medium is busy, and postpones its packet transmission. Accordingly, even if an access point of a wireless communication system using CSMA has an adaptive array antenna, space division multiple communication in which plural stations perform simultaneous communication through the same channel cannot be efficiently performed.

BRIEF SUMMARY OF THE INVENTION

It is an object of the present invention to provide a wireless communication system and wireless station by which communication between an access point and plural stations can be efficiently performed even when SDMA is used with CSMA.

According to the first aspect of the invention, in a wireless communication system which exchanges data between an access point and plural stations, the station comprises: a received power measurement unit which measures power of the received data transmitted from the access point; a received data type detection unit which detects the type of the received data; a beam gain estimation unit which determines the presence/absence of directional beam control at the access point, on the basis of the received power measured by the received power measurement unit, and the received data type detected by the received data type detection unit; and a transmitting power control unit which controls transmitting power for transmitting data to the access point, in accordance with the result of the determination by the beam gain estimation unit.

According to the second aspect of the invention, in a wireless communication system which exchanges data between an access point and plural stations by CSMA (Carrier Sense Multiple Access), the station comprises: a received power measurement unit which measures power of the received data transmitted from the access point; a received data type detection unit which detects the type of the received data; a beam gain estimation unit which determines the presence/absence of directional beam control in the access point, on the basis of the received power measured by the received power measurement unit, and the received data type detected by the received data type detection unit; a transmitting power control unit which controls transmitting power for transmitting data to the access point, in accordance with the result of the determination by the beam gain estimation unit; and a carrier sense control unit which controls the carrier sense level of the station in accordance with the result of the determination by the beam gain estimation unit.

According to the third aspect of the invention, in a wireless communication system which exchanges data between an access point and plural stations, the station comprises: a received power measurement unit which measures the received power of the first data which is broadcast from the access point, and measures the received power of the second data which is unicast from the access point to the station; a beam gain estimation unit which determines the presence/absence of directional beam control in the access point, on the basis of the first and second received powers measured by the received power measurement unit; and a transmitting power control unit which controls transmitting power for transmitting data to the access point, if the beam gain estimation unit determines that the access point is performing directional beam control.

According to the fourth aspect of the invention, in a wireless communication system which exchanges data between an access point and plural stations by CSMA (Carrier Sense Multiple Access), the station comprises: a received power measurement unit which measures the received power of the first data which is broadcast from the access point, and measures the received power of the second data which is unicast from the access point to the station; a beam gain estimation unit which determines the presence/absence of directional beam control in the access point, on the basis of the first and second received powers measured by the received power measurement unit; a transmitting power control unit which controls transmitting power for transmitting data to the access point, if the beam gain estimation unit determines that the access point is performing directional beam control; and a carrier sense control unit which controls the carrier sense level of the station in accordance with the result of the determination by the beam gain estimation unit.

According to the fifth aspect of the invention, a wireless station which exchanges data with an access point, comprises: a received power measurement unit which measures the received power of the first data which is broadcast from the access point, and measures the received power of the second data which is unicast from the access point to the station; a beam gain estimation unit which determines the presence/absence of directional beam control in the access point, on the basis of the first and second received powers measured by the received power measurement unit; and a transmitting power control unit which controls transmitting power for transmitting data to the access point, if the beam gain estimation unit determines that the access point is performing directional beam control.

According to the sixth aspect of the invention, wireless station which exchanges data with an access point by CSMA (Carrier Sense Multiple Access), comprises: a received power measurement unit which measures the received power of the first data which is broadcast from the access point, and measures the received power of the second data which is unicast from the access point to the station; a beam gain estimation unit which determines the presence/absence of directional beam control in the access point, on the basis of the first and second received powers measured by the received power measurement unit; a transmitting power control unit which controls transmitting power for transmitting data to the access point, if the beam gain estimation unit determines that the access point is performing directional beam control; and a carrier sense control unit which controls the carrier sense level of the station in accordance with the result of the determination by the beam gain estimation unit.

In this invention, a wireless station controls the transmitting power for communication with an access point. When this wireless station is communicating with the access point, another wireless station present near this wireless station is less likely to sense busy of a wireless medium by carrier sensing. This increases the number of multiple connections. Accordingly, the transmission efficiency can be improved when SDMA is applied.

Also, a wireless station controls the carrier sense level. When another wireless station present near this wireless station is communicating with an access point, this wireless station can be less likely to sense busy of a wireless communication medium by controlling the carrier sense level. Since this increases the number of multiple connections, the transmission efficiency can be improved when SDMA is applied.

BRIEF DESCRIPTION OF THE SEVERAL VIEWS OF THE DRAWING

FIG. 10 is a view explaining a transmitter power control procedure when data is exchanged between a wireless station and an access point, in which transmitting power is decided through association process;

DETAILED DESCRIPTION OF THE INVENTION

Embodiments of the present invention will be described below with reference to the accompanying drawing.

Figure 1:
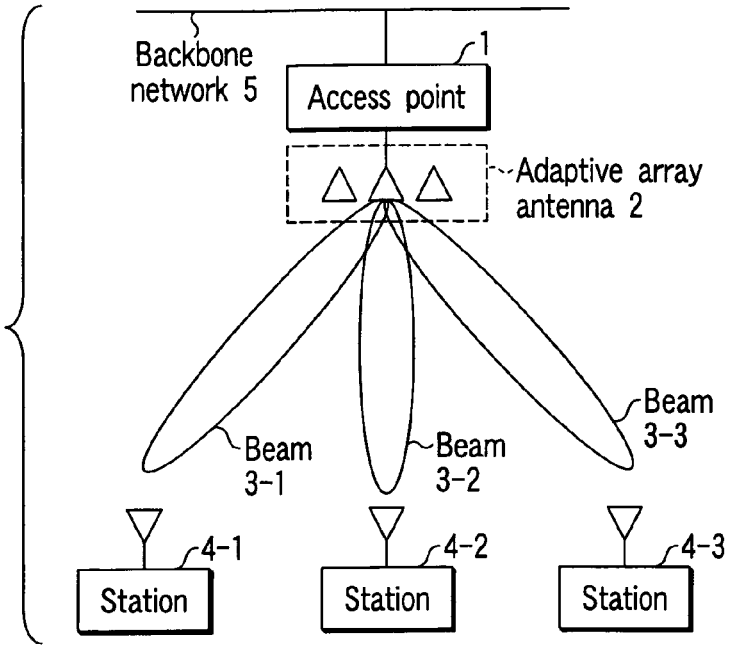
FIG. 1 is a view showing the arrangement of a wireless LAN system as a wireless communication system according to the first embodiment of the present invention.

FIG. 1 shows a wireless communication system according to the first embodiment of the present invention. This wireless communication system is configured as a wireless LAN system. This wireless LAN system complies with, e.g., the IEEE802.11 (including IEEE802.11a and IEEE802.11b) standard. That is, FIG. 1 shows a BSS (Basic Service Set) comprising an access point (AP) 1 as an access point and wireless stations (STAs) 4-1 through 4-3 as plural wireless clients which connect to the access point 1.

The access point 1 may be installed in a specific fixed position and connected to a backbone network 5. This access point 1 has an adaptive array antenna 2 which forms plural relatively narrow directional patterns (to be also referred to as directional beams or antenna beams hereinafter) 3-1 through 3-3.

By using these antenna beams 3-1 through 3-3, the access point 1 can simultaneously communicate with plural wireless stations (to be simply referred to as stations or terminals hereinafter) 4-1 through 4-3 using the same channel. That is, the access point 1 performs SDMA to the stations 4-1 through 4-3. In this embodiment, the access point 1 forms three antenna beams 3-1 through 3-3 to communicate simultaneously with the three stations 4-1 through 4-3, respectively. However, the number of the antenna beams and the number of the stations as objects of simultaneous communication can be any arbitrary number which is 2 or more. Although the stations 4-1 through 4-3 are generally installed in fixed positions, they can also be mobile or mounted on mobile bodies.

The configuration of the access point 1 according to this embodiment will be explained below with reference to FIG. 2.

Receivers 11-1 through 11-3 receive transmission signals from the stations 4-1 through 4-3 via the antenna beams 3-1 through 3-3 of the adaptive array antenna 2. The received signals are subjected to processing including demodulation and decoding, thereby received signals RS-1 through RS-3 are formed.

Transmitters 12-1 through 12-3 generate transmission signals TS1 through TS3 to be transmitted to the stations 4-1 through 4-3 via the antenna beams 3-1 through 3-3 of the adaptive array antenna 2. These transmission signals TS1 through TS3 are supplied to the adaptive array antenna 2.

The received signals RS1 through RS3 from the receivers 11-1 through 11-3 are input to a reception controller 13 and subjected to a predetermined receiving process.

A transmission controller 14 performs a transmitting process, e.g., generates data to be transmitted to the stations (STAs) 4-1 through 4-3 by broadcast or unicast. These data generated by the transmission controller 14 are transmitted as transmission signals TS1 through TS3 to the stations (STAs) 4-1 through 4-3 via the transmitters 12-1 through 12-3, respectively.

A practical configuration of the adaptive array antenna 2 will be described below with reference to FIG. 3.

Figure 3:
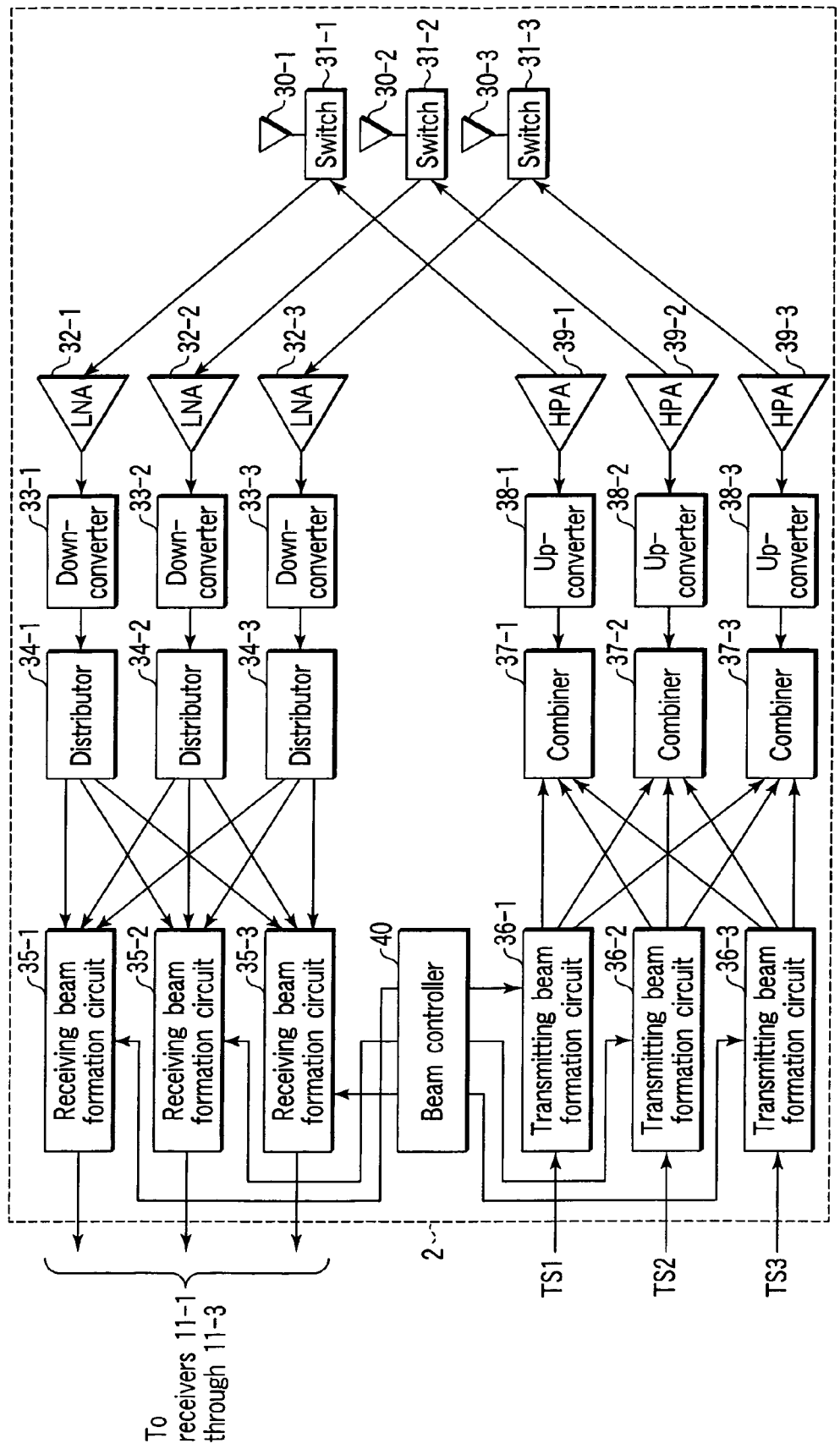
FIG. 3 is a block diagram showing the configuration of an adaptive array antenna.

As shown in FIG. 3, this adaptive array antenna 2 includes antenna elements 30-1 through 30-3, transmission/reception switches 31-1 through 31-3, low-noise amplifiers (LNAs) 32-1 through 32-3, down-converters 33-1 through 33-3, distributors 34-1 through 34-3, receiving beam formation circuits 35-1 through 35-3; transmitting beam formation circuits 36-1 through 36-3, combiners 37-1 through 37-3, up-converters 38-1 through 38-3, high-frequency power amplifiers (HPAs) 39-1 through 39-3, and a beam controller 40.

The transmission/reception switches 31-1 through 31-3, the LNAs 32-1 through 32-3, the down-converters 33-1 through 33-3, the distributors 34-1 through 34-3, the combiners 37-1 through 37-3, the up-converters 38-1 through 38-3, and the HPAs 39-1 through 39-3 are formed in one-to-one correspondence with the antenna elements 30-1 through 30-3, i.e., the numbers of these units are the same as the number (in this embodiment, three) of the antenna elements 30-1 through 30-3. The numbers of the receiving beam formation circuits 35-1 through 35-3 and the transmitting beam formation circuits 36-1 through 36-3 are the same as the number (in this embodiment, three) of the antenna beams formed by the adaptive array antenna 2. The number of these antenna beams can be smaller or larger than the number of the antenna elements 30-1 through 30-3.

The operation of the adaptive array antenna 2 will be explained below. Wireless Frequency (RF) signals received by the antenna elements 30-1 through 30-3 are input to the LNAs 32-1 through 32-3 via the transmission/reception switches 31-1 through 31-3, respectively. The input RF signals are amplified to a predetermined level by the LNAs 32-1 through 32-3. These RF signals amplified by the LNAs 32-1 through 32-3 are input to the down-converters 33-1 through 33-3. The down-converters 33-1 through 33-3 convert the input RF signals into intermediate frequency (IF) or base band and supply the converted signals to the distributors 34-1 through 34-3.

The distributor 34-1 distributes the output signal from the down-converter 33-1 to the receiving beam formation circuits 35-1 through 35-3. The distributor 34-2 distributes the output signal from the down-converter 33-2 to the receiving beam formation circuits 35-1 through 35-3. The distributor 34-3 distributes the output signal from the down-converter 33-3 to the receiving beam formation circuits 35-1 through 35-3.

The receiving beam formation circuits 35-1 through 35-3 combine the input signals by weighting them in accordance with a complex weighting factor for reception set by the beam controller 40. Consequently, plural receiving antenna beams are formed. Signals corresponding to these receiving antenna beams from the receiving beam formation circuits 35-1 through 35-3 are supplied to the receivers 11-1 through 11-3 shown in FIG. 2.

Figure 2:
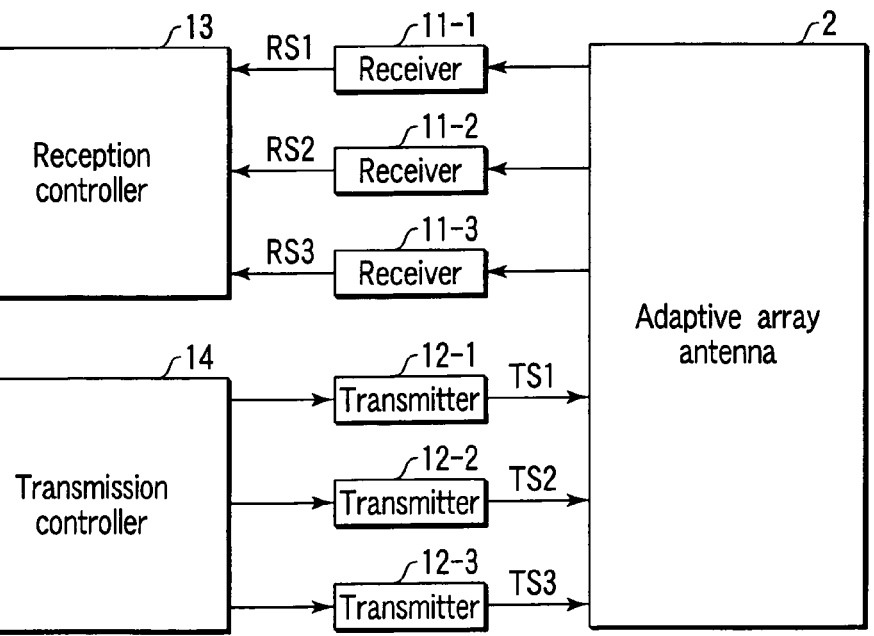
FIG. 2 is a block diagram showing the configuration of an access point apparatus.

On the other hand, the transmission signals TS1 through TS3 from the transmitters 12-1 through 12-3 shown in FIG. 2 are input to the transmitting beam formation circuits 36-1 through 36-3, respectively. These transmitting beam formation circuits 36-1 through 36-3 multiply the input transmission signals by plural complex weighting factors for transmission set by the beam controller 40.

Plural output signals from the transmitting beam formation circuit 36-1 are input to the combiners 37-1 through 37-3. Plural output signals from the transmitting beam formation circuit 36-2 are also input to the combiners 37-1 through 37-3. Furthermore, plural output signals from the transmitting beam formation circuit 36-3 are input to the combiners 37-1 through 37-3. Each of these combiners 37-1 through 37-3 combines its plural input signals into one signal.

Output signals from the combiners 37-1 through 37-3 are supplied to the up-converters 38-1 through 38-3. These up-converters 38-1 through 38-3 convert signals in intermediate frequency (IF) or base band (BB) into wireless frequency (RF) and input the converted signals to the HPAs 39-1 through 39-3. Transmission signals amplified by the HPAs 39-1 through 39-3 are supplied to the antenna elements 30-1 through 30-3 via the switches 31-1 through 31-3, respectively, and transmitted to the stations 4-1 through 4-3.

As described above, the beam controller 40 sets complex weighting factors for reception with respect to the receiving beam formation circuits 35-1 through 35-3. The beam controller 40 also sets complex weighting factors for transmission with respect to the transmitting beam formation circuits 36-1 through 36-3. Furthermore, with respect to beam formation circuits which make a pair in transmission and reception (e.g., the receiving beam formation circuit 35-1 and the transmitting beam formation circuit 36-1), the beam controller 40 sets weighting factors for communication with the same station.

The access point (AP) 1 transmits a beacon at predetermined intervals. This beacon is transmitted by using transmitting power large enough to be received by the stations (STAs) 4-1 through 4-3 present around the access point 1. A beacon frame must be transmitted to all the stations 4-1 through 4-3. Since, therefore, broadcast transmission is performed, an omnidirectional pattern is used. On the other hand, frame transmission and reception during authentication and association processes must be performed separately for the stations (STAs) 4-1 through 4-3. Hence, for these unicast transmissions, directional beams are preferable to be used.

By using this feature, the stations (STAs) 4-1 through 4-3 according to the first embodiment check the type of received data. The type whether a frame transmitted by an omnidirectional pattern (to be also referred to as an omnidirectional beam hereinafter) or a frame transmitted by a directional beam is checked. A frame transmitted by an omnidirectional pattern is, e.g., a beacon frame defined in IEEE802.11 (including IEEE802.11a and IEEE802.11b). Examples of a frame transmitted by a directional beam are authentication frames and association frames.

By using received power information of an omnidirectional beam and received power information of a directional beam, the gain of a directional beam used by the access point 1 to transmit a unicast frame addressed to a station is estimated. It is possible to precisely estimate the gain of the directional beam by considering the transmitted power information for the directional beam and the transmitted power information for the non-directional beam. It is also possible to estimate the gain of the directional beam by considering the transmitted power information and the received power information when a frame type (broadcast/unicast) is not used. On the basis of the result of this estimation, the station checks whether the access point 1 forms a directional beam. If this is possible, the station then checks whether SDMA is applicable at the access point 1. If SDMA can be expected to take place, the station adjusts the transmitting power of data addressed to the access point 1.

Figure 4:
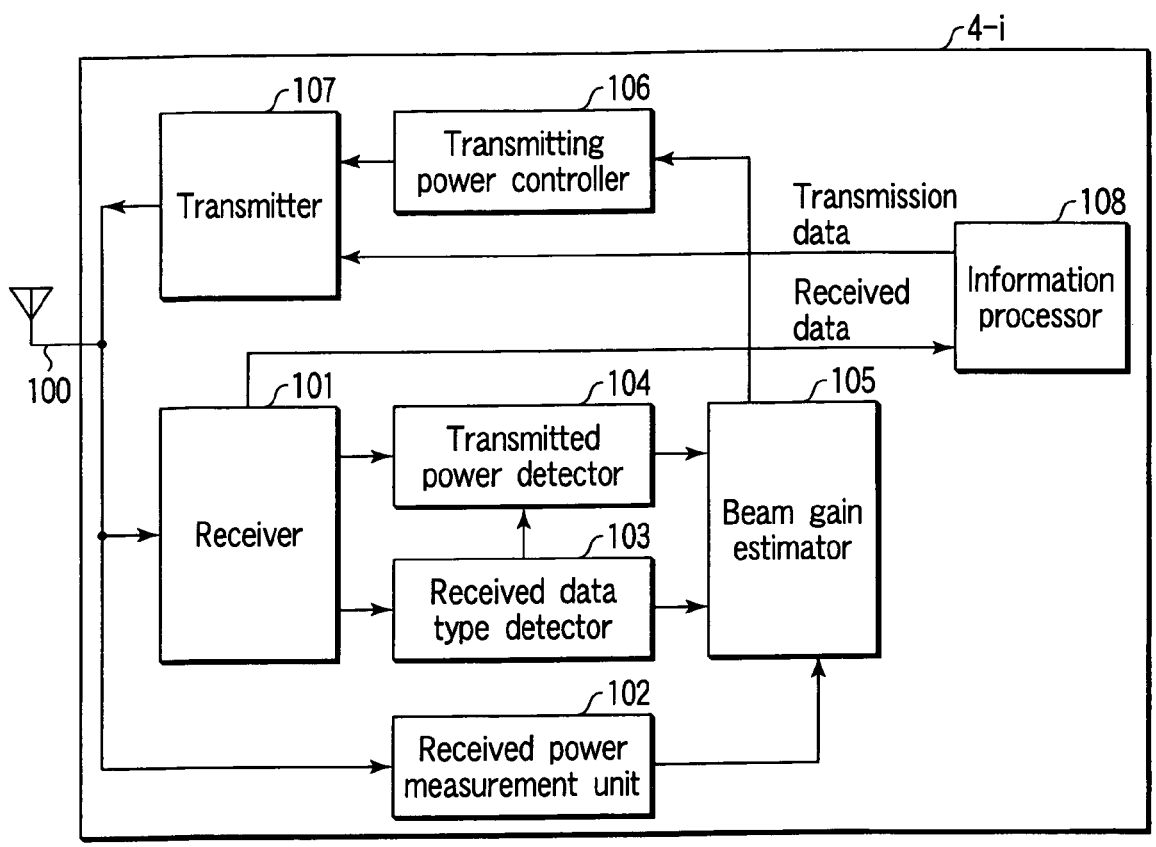
FIG. 4 is a block diagram showing the configuration of a wireless station.

FIG. 4 is a schematic view showing the arrangement of the main parts of the station (STA) 4-i (i=1 through 3).

This station 4-i includes an antenna 100, a receiver 101, a received power measurement unit 102, a received data type detector 103, a transmitted power detector 104, a beam gain estimator 105, a transmitting power controller 106, a transmitter 107, and an information processor 108. It is possible to omit the transmitted power detector 104.

The information processor 108 transfers the transmission data to the transmitter 107 when a transmission request is generated due to the preparation of transmission data or the like according to, e.g., a user's operation.

The transmitter 107 converts these transmission data (e.g., IP packets) into a MAC frame defined by IEEE802.11. In addition, the transmitter 107 converts a MAC frame managed as digital data into a wireless signal in a predetermined frequency (e.g., 2.4 GHz), and transmits the signal as a wireless wave from the antenna 100.

On the other hand, a signal received by the antenna 100 is input to the receiver 101. The receiver 101 converts the received signal into a MAC frame, extracts the received data from an information field in this MAC frame, and transfers the extracted received data to the information processor 108. The information processor 108 performs a process of displaying the received data on a display and the like. Note that the information processor 108 can also perform other various information processing operations.

A MAC frame defined by IEEE802.11 can be used not only as a data frame for communication in exchanging data but also for management and access control. This management and access control includes authentication by the access point 1 prior to communication and transmission of a message to assure the transmission right of a wireless station. These procedures are defined in IEEE802.11. The receiver 101 and the transmitter 107 execute these procedures and generate a MAC frame.

Figures 5A, 5B:
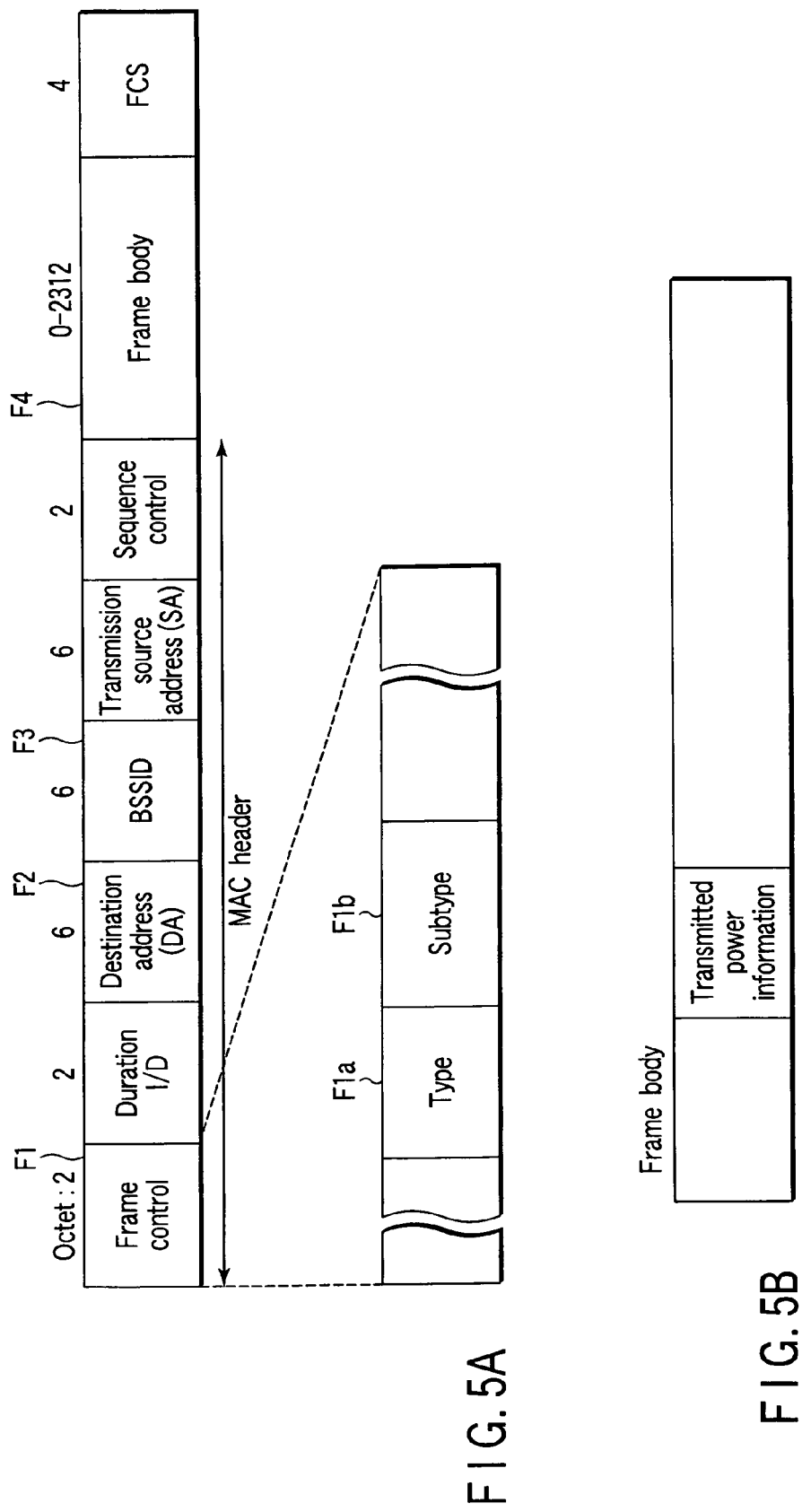
FIGS. 5A and 5B are views explaining a MAC frame defined in IEEE802.11.

As shown in FIG. 5A, a MAC frame consists of MAC header, data field, and frame check sequence (FCS). The MAC header has a maximum of 30 bytes and stores various pieces of control information. FIG. 5A shows the case of a data frame, which is described later. The data field stores data having a maximum of 2,312 bytes. The FCS is used to check whether the data is correctly transmitted.

MAC frames are classified into three types: a management frame such as beacon, authentication and association frames for managing a wireless system; a data frame for data communication, and a control frame used for access control. The type of a MAC frame is described in the type field F1a in the frame control field F1 of the MAC header. Also, the subtype field F1b in the frame control field F1 indicates the details of the type of a MAC frame.

When a data frame is transmitted from the access point to the station, the MAC header further includes a destination address (DA) F2, BSSID (Basic Service Set Identification) F3 which is a MAC address of the access point actually transmitting the frame, and a source address (SA) of the frame, as shown in FIG. 5A. As for a management frame, the order of BSSID and SA is reversed and the address fields come in order of DA-SA-BSSID. The destination address F2 holds a predetermined broadcast address or the address of a station (STA) 4-i. As for a control frame (RTS/CTS), the MAC header includes Frame Control, Duration ID, two of address fields RA, TA, and BBSID. Depending on the kind of frame, only one address field is included. Frame body is not included. The MAC header of the control frame RTS includes Frame Control, Duration ID, address fields RA and TA. The MAC header of the control frame CTS includes Frame Control, Duration ID, address fields RA and FCS.

Referring back to FIG. 4, the received power measurement unit 102 measures the power (received power) induced at the antenna when frame data is received by the receiver 101.

The received data type detector 103 checks whether a MAC frame is broadcast or unicast, from MAC header portion or information stored in data field F4 which is a frame body in the MAC frame obtained by the receiver 101.

That is, from the type field F1a and the subtype filed F1b in a MAC frame, the received data type detector 103 checks whether the MAC frame is a beacon frame (broadcast frame) or an authentication or association frame (unicast frame).

Note that the received data type detector 103 can also check whether a MAC frame obtained by the receiver 101 is broadcast or unicast, from the destination address (DA) F2 in the MAC frame. However, an explanation will be made by taking the former case as an example.

From a MAC frame obtained by the receiver 101, the transmitted power detector 104 extracts information pertaining to the transmitting power (transmitted power information) when this MAC frame is transmitted from the access point 1. This transmitted power information can be either a power value itself or a relative value (e.g., a level value) based on a certain predetermined value. In short, the transmitted power information can be any information provided with which the station (STA) 4-i can detect fluctuations of the transmitted power. This transmitted power information is stored in a predetermined position of a MAC frame. For example, the transmitted power information is desirably indicated in any or several undefined (reserved) fields, of the frame body F4 in FIG. 5A those of such as beacon, authentication and association frames, in IEEE802.11 (including IEEE802.11a and 802.11b) standard. However, the transmitted power information can also be indicated in any other fields in a MAC frame, which is unused in operation of the wireless communication system.

For example, in an authentication frame, the transmitted power information can be expressed by using one or plural undefined status codes in a status code field contained in the data field in FIG. 5A as the authentication frame body (see FIG. 5B).

Also, the transmitted power of each MAC frame type can be predetermined and, in accordance with the types of MAC frames such as beacon, authentication, and association frames, the corresponding transmitted powers can be pre-stored in the transmitted power detector 104. In this case, when the received data type detector 103 detects the type of the received MAC frame, the transmitted power detector 104 reads out the transmitted power corresponding to the detected type.

The beam gain estimator 105 estimates the gain of the directional beam of data received by the receiver 101, from the type of the received data detected by the data type detector 103, the received power measured by the received power measurement unit 102, and the transmitted power information of the received data obtained by the transmitted power detector 104. The data type indicates whether a frame is broadcast (frame) data such as a beacon frame, or unicast (frame) data such as authentication or association frames. The beam gain estimator 105 also checks the presence/absence of directional beam control at the access point 1. If the examined gain value (level) is equal to or more than a predetermined level, the beam gain estimator 105 determines that SDMA is applicable at the access point 1.

When the beam gain estimator 105 determines that SDMA is applicable at the access point 1, the transmitting power controller 106 lowers, by, e.g., a predetermined level, the transmitting power of data addressed to the access point 1. This transmitting power is preferable to be the minimum transmitting power within the receivable range at the access point 1, i.e., preferable to be the minimum necessary transmitting power for the access point 1. Note that a circuit for controlling the transmitting power is well known to those skilled in the art.

Figure 6:
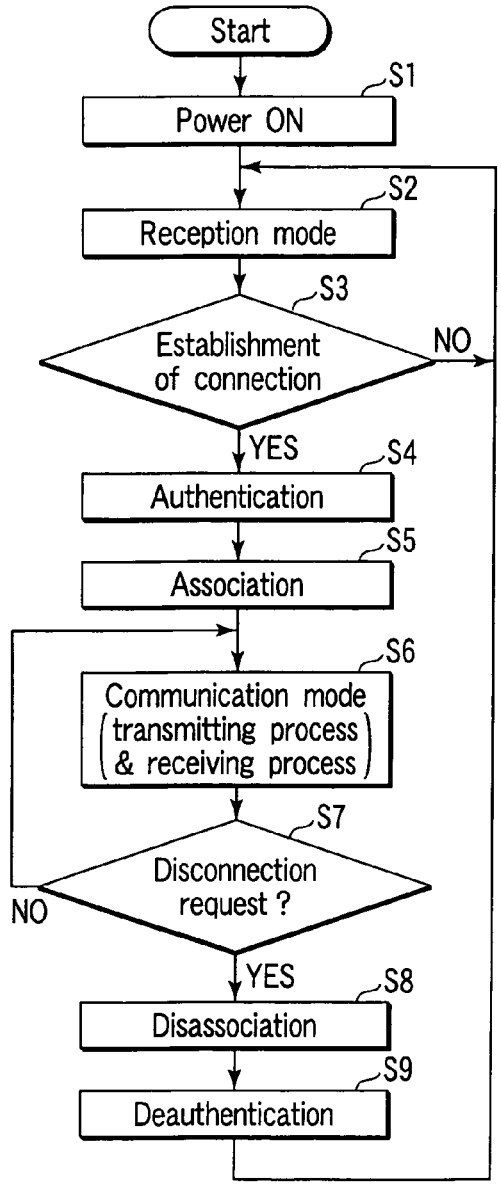
FIG. 6 is a flow chart explaining the operation of processing in a wireless station.

FIG. 6 is a flow chart to explain the operation of processing in a station (STA) 4-i.

Referring to FIG. 6, when the power supply is turned on (step S1), the station (STA) 4-i is set in a reception mode. For example, when a request comes from the access point 1, the station (STA) 4-i can receive it immediately (step S2).

In this reception mode, suppose a transmission request for transmitting data is generated in the station (STA) 4-i (by, e.g., a user's operation), and a request to establish a connection with the access point 1 is generated (step S3). In this case, processes called authentication and association are executed between the station (STA) 4-i and the access point 1 (steps S4 and S5). Note that these authentication and association processes comply with the IEEE802.11 (including IEEE802.11a and IEEE802.11b) standard.

When the authentication and association process succeeded and connection between the station (STA) 4-i and the access point 1 is established, the station (STA) 4-i can communicate with the access point 1 through this connection (step S6).

When a disconnection request is generated, the station (STA) 4-i disconnects the established connection through operations called disassociation and deauthentication (steps S7 and S8), and returns to the reception mode (step S2).

A method for disconnection such as disassociation and deauthentication processes also complies with the IEEE802.11 (including IEEE802.11a and IEEE802.11b) standard.

Next, a transmitter power control procedure when data are to be transmitted to the access point 1 will be explained below with reference to FIG. 7, by taking one of the stations (STAs) 4-i (e.g., the station (STA) 4-1) as an example.

The access point 1 transmits a beacon frame every predetermined period (it may not be in a strict cycle)(step S101). In principle, the station (STA) 4-i can receive a beacon frame not only in the reception mode depicted as step S2 in FIG. 6, but also during authentication in step S4, association in step S5, disassociation in step S7, deauthentication in step S8, and in communication mode in step S6. In the reception mode, for example, if the received packet type detector 103 of the station (STA) 4-i determines that data received via the antenna 100 is a beacon frame, the station (STA) 4-i inputs, to the beam gain estimator 105, the received power of this beacon frame measured by the received power measurement unit 102 and transmitting power information contained in the beacon frame or prestored transmitted power information corresponding to the beacon frame (step S102).

Note that whenever a beacon frame is received, the measured received power and the transmitted power information may be stored in a time series manner.

After that, suppose a request to establish a connection is generated at the station (STA) 4-i (step S3 in FIG. 6), and the flow advances to the authentication process which is step S4 in FIG. 6. In this case, the transmitter 107 of the station (STA) 4-i transmits, to the access point 1, an authentication frame (addressed to the access point 1) which is a signal for starting an authentication request, and in which authentication transaction sequence number (to be simply referred to as ATSN hereinafter)=1 (step S103). If transmitting power previously set by the transmitting power controller 106 is available, the station (STA) 4-i transmits the authentication frame of ATSN=1 to the access point 1 using that transmitting power. If not, the authentication frame can be transmitted by a predetermined default transmitting power.

Note that ATSN is indicated in the frame body F4 of the authentication frame.

The access point 1 receives the authentication frame of ATSN=1 and, on the basis of the received power and the like, sets a directional beam to be directed to the station (STA) 4-i (step S104). That is, the access point 1 sets the aforementioned weighting factor corresponding to the direction in which the station (STA) 4-i exists.

By using this directional beam, the access point 1 transmits an authentication frame of ATSN=2 (a response to the authentication frame of ATSN=1) to the station (STA) 4-i (step S105).

This authentication frame of ATSN=2 can contain transmitted power information as described above.

If the received packet type detector 103 determines that the data received via the antenna 100 is an authentication frame of ATSN=2, the received power of this frame measured by the received power measurement unit 102 and transmitted power information extracted from the frame by the transmitted power detector 104 or prestored transmitted power information corresponding to the authentication frame of ATSN=2 are input to the beam gain estimator 105 (step S106). This is possible when the access point does not set the directional beam or when the directional angle of the first directional beam is (relatively widely) predetermined and known at the station.

Figure 8:
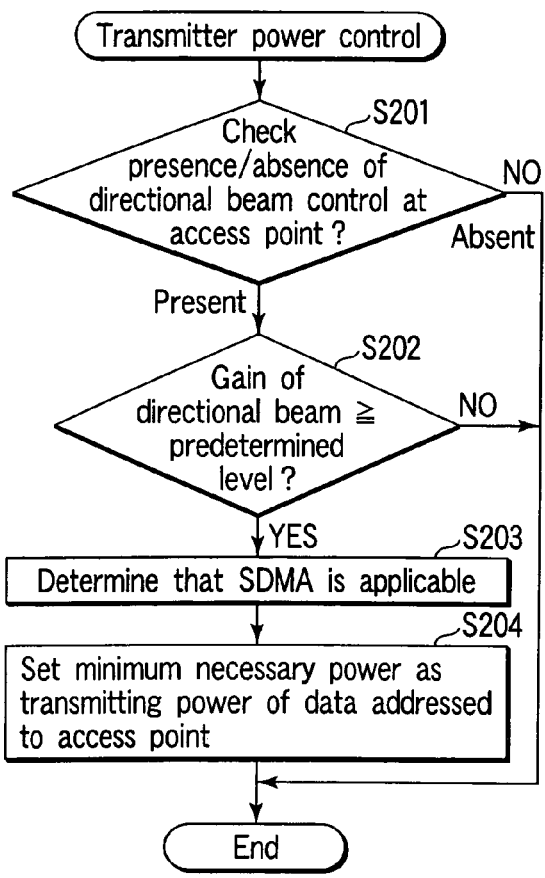
FIG. 8 is a flow chart explaining a transmitter power control procedure of a wireless station.
Figure 7:
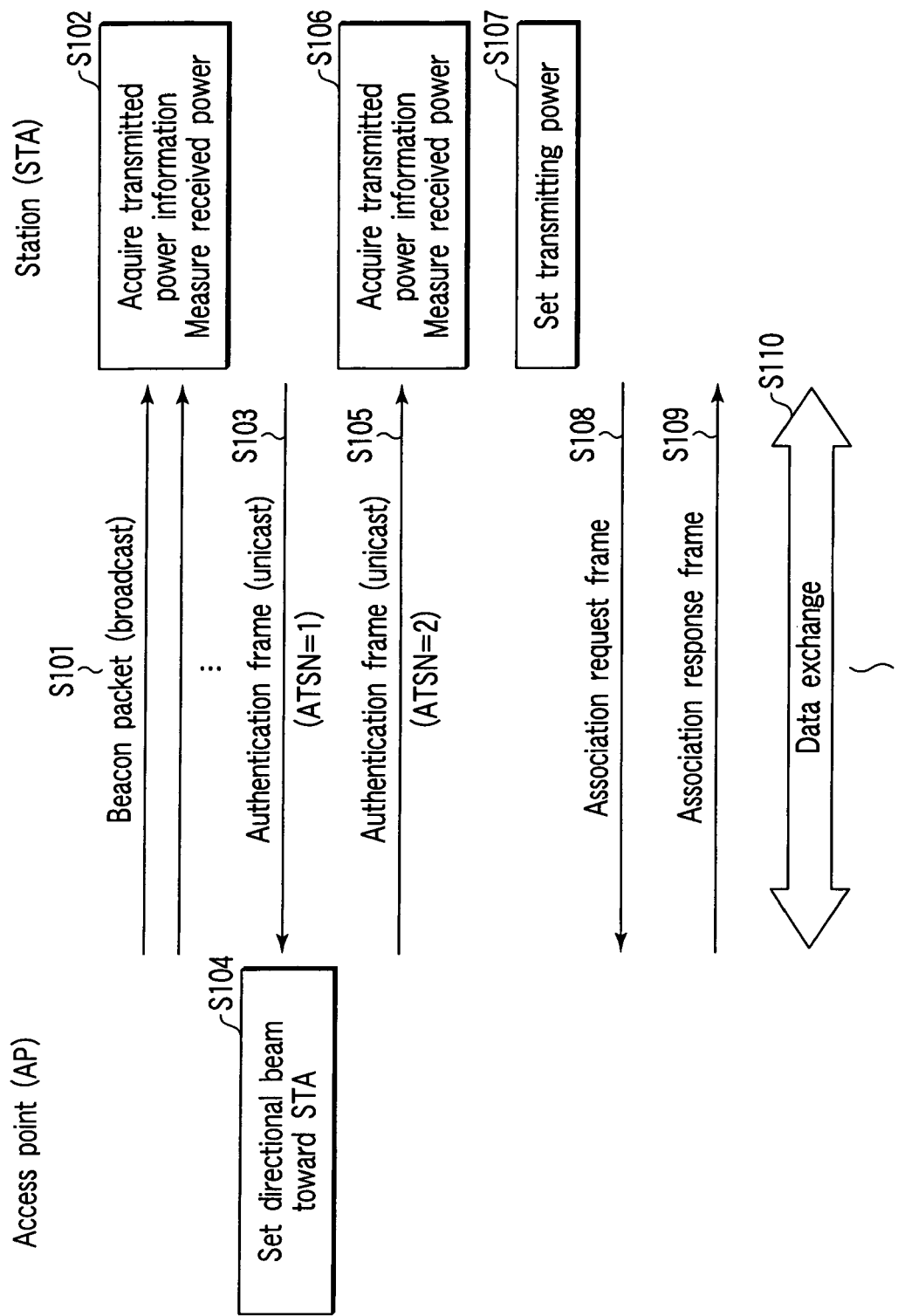
FIG. 7 is a view explaining a transmitter power control procedure when data is exchanged between a wireless station and an access point.

By using the received power and transmitted power information of the authentication frame of ATSN=2 obtained in step S106 of FIG. 7, the beam gain estimator 105 and the transmitting power controller 106 perform processing as shown in FIG. 8, thereby the transmitting power is adjusted (step S107).

Referring to FIG. 8, the beam gain estimator 105 checks the presence/absence of directional beam control in the access point 1, on the basis of the received power and transmitted power information of the received beacon frame obtained in step S102 of FIG. 7 and the received power and transmitted power information of the authentication frame of ATSN=2 obtained in step S106 of FIG. 7 (step S201). The presence/absence of directional beam control means whether the directivity to the station (STA) 4-i at the access point 1 is narrowed, or in other words whether the antenna beam is directed to the station (STA) 4-i.

For example, assume that the transmitted power information of a beacon frame transmitted by an omnidirectional pattern is "3" and the received power of this frame is "2", and that the transmitted power information of an authentication frame presumably transmitted by using a directional beam is "3" and the received power of this frame is "4". Note that each numerical value indicates not an actual power value but a level corresponding to the power value. In this case, the received power increases although the transmitting power of the access point 1 remains (at) "3". Therefore, it is estimated that this access point 1 is performing directional beam control having a gain of, e.g., level 1. When the detection of the transmitted power is omitted, presence/absence of the directional beam control can be determined similarly from the promise (or assumption) that the access point is transmitting with the same transmission power.

Likewise, assume that the transmitted power information of a beacon frame is "3" and its received power is "2", and that the transmitted power information of an authentication frame is "4" and its received power is "4". In this case, although the transmitted power of the access point 1 increases by "1", the received power increases by "2". That is, the degree of a change in the transmitted power does not correspond to that of a change in the received power. In this case, it is also estimated that the access point 1 is performing directional beam control having a gain of, e.g., level 1.

Also, assume that the transmitted power information of a beacon frame is "3" and its received power is "2", and that the transmitted power information of an authentication frame is "4" and its received power is "3". In this case, the transmitted power of the access point 1 increases by "1", and the received power also increases by "1"; the degree of a change in the transmitted power corresponds to that of a change in the received power. When this is the case, the access point 1 is controlling its transmitting power, and the received power also changes according to it. Therefore, it is estimated that the access point 1 is not performing directional beam control with the use of a directional antenna.

The accuracy of this estimation can be improved by performing the estimation from the results of reception of two or more beacon frames and two or more authentication frames.

If it is determined in step S201 that the access point 1 is performing directional beam control, the beam gain estimator 105 checks whether the directivity of the access point 1 is well narrowed to the station (STA) 4-i and the antenna beam is strong enough to perform SDMA. That is, if the level of the gain of the directional beam estimated as above is equal to or higher than a predetermined level (step S202), the beam gain estimator 105 determines that SDMA is applicable at the access point 1 (step S203).

For example, if the gain of the directional beam is level 1 or more, it is determined that the beam of the access point 1 is narrowed enough to perform SDMA (it is determined that SDMA is applicable).

Note that step S202 is not a necessary determination step and can be omitted. In this case, if it is determined in step S201 that the access point 1 is performing directional beam control, the flow advances to step S204 by skipping steps S202 and S203.

If in step S203 the beam gain estimator 105 determines that SDMA is applicable at the access point 1 as described above, the flow advances to step S204, and the transmitting power controller 106 lowers the transmitting power of data addressed to the access point 1 by a predetermined level. Preferably, the transmitting power controller 106 sets the minimum necessary power as the transmitting power of data addressed to the access point 1. That is, a sufficiently small value within the receivable range at the access point 1 is set.

Referring back to FIG. 7, if in step S107 transmitter power control is performed in accordance with FIG. 8 to set a new transmitting power, this set transmitting power is used as the transmitting power of data addressed to the access point 1 thereafter.

If authentication process succeeded, then association is performed if following the IEEE802.11 standard. That is, if the transmitting power is set in step S107, the transmitter 107 of the station (STA) 4-i transmits an association request frame to request starting the association process to the access point 1 by the set transmitting power (step S108).

When this association request frame is received successfully, the access point 1 transmits, as a response to the request, an association response frame to the station (STA) 4-i (step S109). If this association process succeeded, the access control phase is completed, and data frames are exchanged with the access point 1 in accordance with the communication mode as shown in step S6 of FIG. 6 (step S110).

Figure 9:
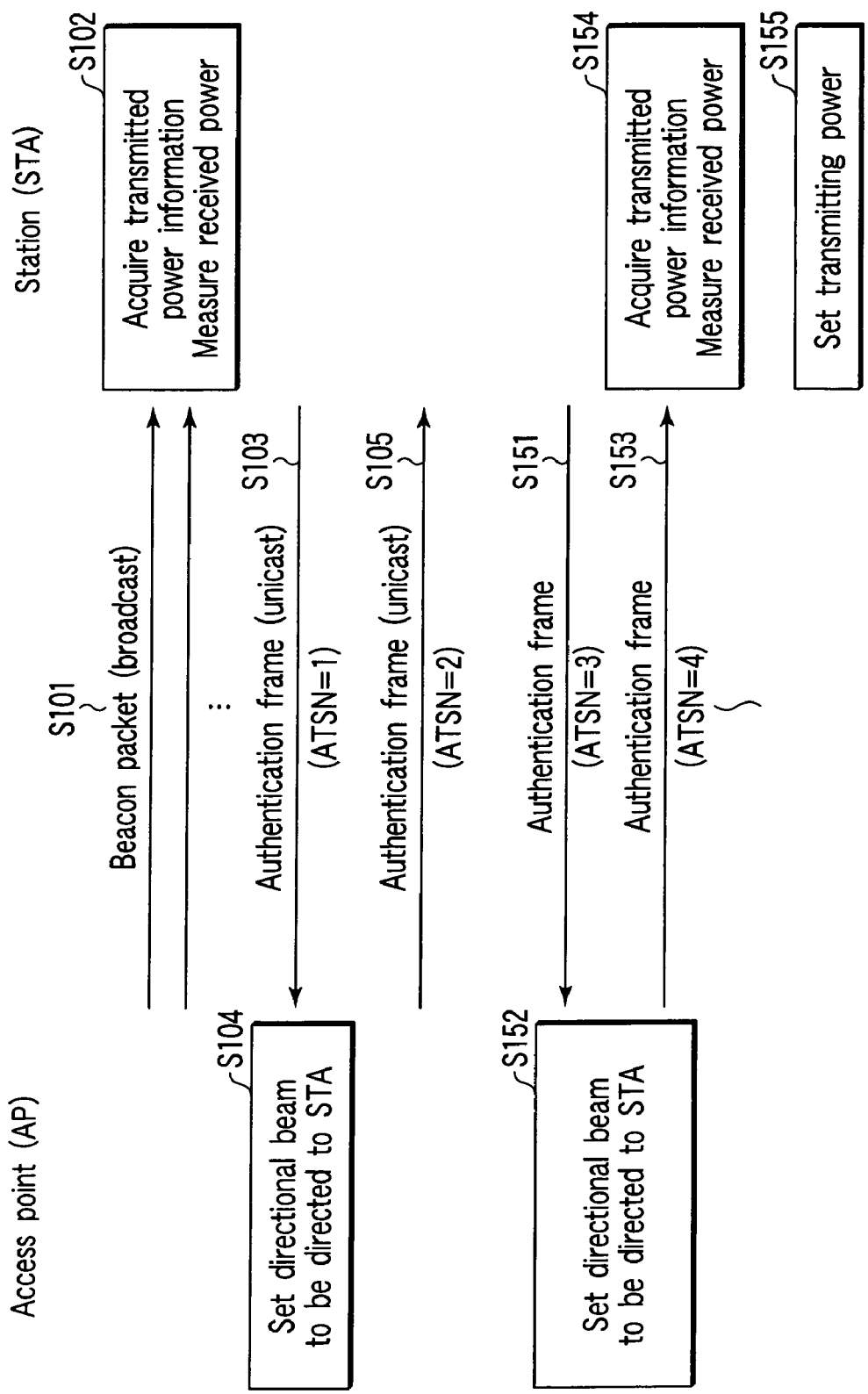
FIG. 9 is a view explaining a transmitter power control procedure when data is exchanged between a wireless station and an access point, in which shared key authentication is performed.

Shared key type authentication will be described below with reference to FIG. 9. Note that the same reference numerals as in FIG. 7 denote the same processes with FIG. 9, and different processes will be explained. That is, in this shared key authentication, after receiving the authentication frame of ATSN=2 in step S105, the station (STA) 4-i transmits an authentication frame of ATSN=3 to the access point 1 (step S151). If transmitting power is set previously by the transmitting power controller 106 and is available, the station (STA) 4-i transmits the authentication frame of ATSN=3 to the access point 1 by using that transmitting power. If not, the authentication frame can be transmitted by a predetermined default transmitting power.

The access point 1 receives this authentication frame of ATSN=3 and, on the basis of the received power and the like, sets a directional beam directed to the station (STA) 4-i (step S152). That is, the access point 1 resets the aforementioned weighting factor corresponding to the direction in which the station (STA) 4-i exists.

By using this directional beam, the access point 1 transmits an authentication frame of ATSN=4 to the station (STA) 4-i (step S153).

This authentication frame of ATSN=4 can contain transmitted power information as described above.

If the received data type detector 103 determines that data frame received via the antenna 100 is an authentication frame of ATSN=4, the received power of this frame measured by the received power measurement unit 102 and transmitted power information extracted from the frame by the transmitted power detector 104 or prestored transmitted power information at the transmitted power detector 104 corresponding to the authentication frame of ATSN=4 are input to the beam gain estimator 105 (step S154).

By using the received power and transmitted power information of the received beacon frame obtained in step S102 of FIG. 7 and the received power and transmitted power information of the authentication frame of ATSN=4 obtained in step S154 described above, the beam gain estimator 105 and the transmitting power controller 106 perform processing as shown in FIG. 8, thereby the transmitting power is set (step S155).

The rest is the same as the operation of processing after step S108 in FIG. 7.

Next, an operation when the station (STA) 4-i performs transmitter power control not in authentication but in association will be described below with reference to FIG. 10. Note that the same reference numerals as in FIG. 7 denote the same processes in FIG. 10, and different processes will be explained. That is, after the station (STA) 4-i receives the authentication frame of ATSN=2 in step S105, the flow advances to step S108 by skipping steps S106 and 107, and the station (STA) 4-i transmits an association request frame to request starting the association process to the access point 1 (step S108). When this association request frame is received successfully, the access point 1 transmits, as a response to the request, an association response frame to the station (STA) 4-i (step S110).

This association response frame may also contain transmitted power information as same as the case of the authentication frame.

If the received data type detector 103 determines that data frame received via the antenna 100 is the association response frame, the received power of this frame measured by the received power measurement unit 102 and transmitted power information extracted from the frame by the transmitted power detector 104 or prestored transmitted power information corresponding to the association response frame are input to the beam gain estimator 105 (step S161).

By using the received power and transmitted power information of the received beacon frame obtained in step S102 and the received power and transmitted power information of the association response frame obtained in step S161 described above, the beam gain estimator 105 and the transmitting power controller 106 perform processing as shown in FIG. 8, thereby the transmitting power is set (step S162).

If this association process succeeded, the access control phase is completed, and data frames are exchanged with the access point 1 in accordance with the communication mode as shown in step S6 of FIG. 6 (step S163). The access point 1 receiving the association request frame sets the directional beam directed to the station (STA) 4-i based on the received power or the like. Then, the access point 1 transmits the association response frame to the station (STA) 4-i. Note that both or one of the steps S104 and S109 may be provided.

In this first embodiment as described above, the station (STA) 4-i checks whether the access point 1 is performing directional beam control, from received power of broadcast data transmitted by the access point 1 is received, and from received power of unicast data transmitted by the access point 1 is received (if determining that the access point 1 is performing directional beam control, the station (STA) 4-i further checks whether the directivity is narrowed enough to perform SDMA). If it is determined that the access point 1 is performing directional beam control (such that the directivity is narrowed enough to perform SDMA), the station (STA) 4-i sets preferably the minimum necessary power as the transmitting power to transmit data to the access point 1 thereafter. This reduces interference to other communicating stations (STAs) 4-i (when STA 4-1 is performing transmitter power control, this "i" will be 2 and 3).

The station (STA) 4-1 performs transmitter power control as described above. Therefore, compared to the case in which the station (STA) 4-1 does not perform transmitter power control, the received power of a signal transmitted from this station (STA) 4-1 to the access point 1 is sufficiently small at the other station (STA) 4-i (i=2 or 3) which performs carrier sensing. This reduces the possibility that a wireless medium is detected to be busy at the other station (STA) 4-i (i=2 or 3). That is, if the other station (STA) 4-i (i=2 or 3) does not sense the received power of a transmitted signal from the station (STA) 4-1 to the access point 1, the other station (STA) 4-i (i=2 or 3) does not set an NAV (Network Allocation Vector) defined in IEEE802.11 (if this NAV is set, a station does not access the access point 1 for an interval designated by the NAV). Also, the access point 1 needs not to transmit to other stations (STAs) 4-2 and 4-3 the same data with those transmitted to the station (STA) 4-1 by another directional beam separated from the directional beam used for communication with the station (STA) 4-1. This means the access point 1 needs not to have other stations (STAs) 4-2 and 4-3 set NAV as measures for hidden station problem with respect to the communication with the station (STA) 4-1.

Accordingly, the access point 1 can perform SDMA with plural stations (STAs) 4-i (i=1 through 3). This increases the number of multiple connections compared to the case where the station (STA) 4-i does not perform the transmitter power control described above.

The received data type detector 103 of the above first embodiment checks whether a received frame is a broadcast frame which is to be transmitted by an omnidirectional pattern, or a unicast frame which is to be transmitted by a directional beam, if the access point 1 is performing directional beam control. More specifically, the received data type detector 103 extracts the type filed F1$a$, the subtype filed F1$b$, and the frame body F4 of a MAC frame obtained by the receiver 101. From these pieces of information, the received data type detector 103 determines whether a received frame is a broadcast beacon frame or a unicast authentication/association frame.

In the process to check the access point 1 is performing directional beam control, whether the frame transmitted from the access 1 is a broadcast frame data or a unicast frame can be also discriminated by checking the destination address of the frame, instead of the above method. That is, the received data type detector 103 checks the destination address (DA) of the MAC frame shown in FIG. 5A, and determines that the frame is broadcast if the DA holds a broadcast address, and that the frame is unicast if the DA specifies the station's own address. This method can detect the type of a received frame whether broadcast or unicast and also be realized similar to the above method.

Second Embodiment

In the first embodiment described above, the station (STA) 4-i performs transmitter power control. In the second embodiment, this station (STA) 4-i controls a carrier sense level.

This second embodiment is basically the same as the first embodiment. That is, the station (STA) 4-i checks whether an access point 1 is performing directional beam control, from received power of broadcast frame transmitted by the access point 1 and its transmitted power information, and from received power of unicast frame transmitted by the access point 1 and its transmitted power information (if it is determined that the access point 1 is performing directional beam control, the station (STA) 4-i further checks whether the directivity is narrowed enough at the access point 1 to perform SDMA). If it is determined that the access point 1 is performing directional beam control (such that the directivity is narrowed enough to perform SDMA), the station (STA) 4-i raises its carrier sense level, thereby the sensitivity of carrier sense is suppressed to the minimum necessary level.

Figure 11:
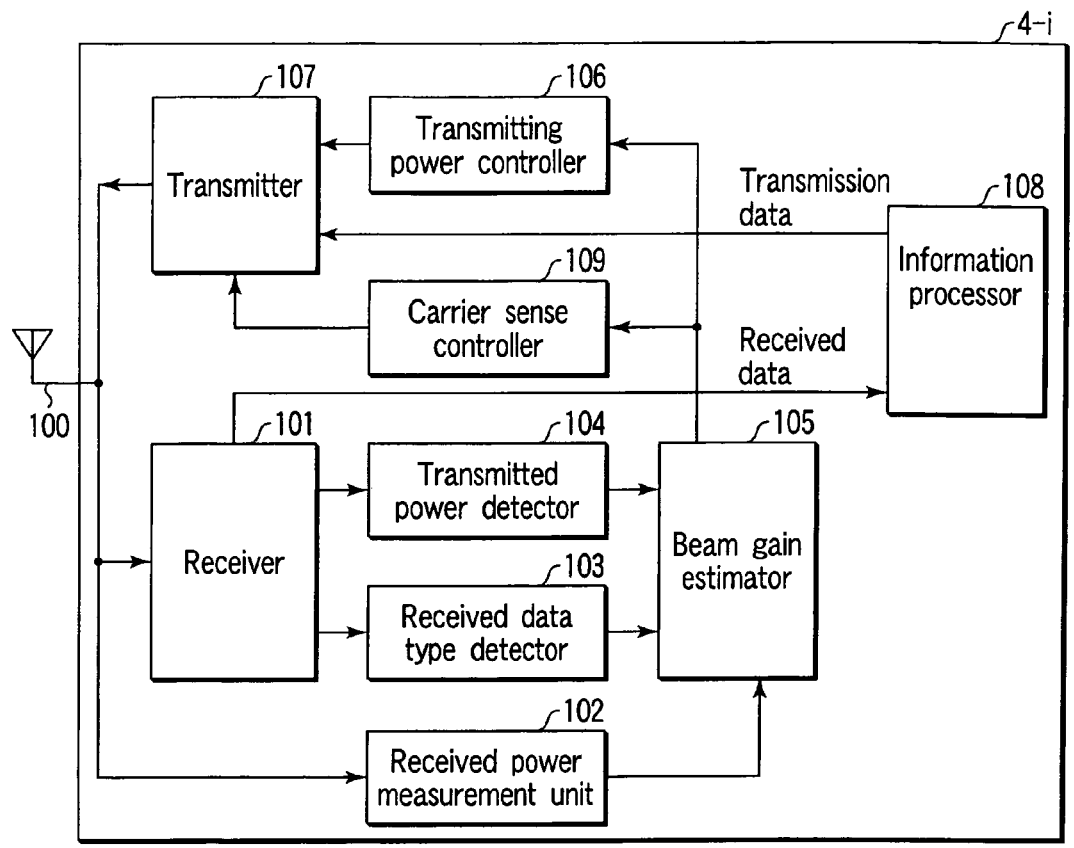
FIG. 11 is a block diagram showing another configuration of a wireless station.

FIG. 11 shows the arrangement of the major components of the station (STA) 4-i according to the second embodiment. The same reference numerals as in FIG. 4 denotes the same parts in FIG. 11, and only a different portion will be explained. That is, referring to FIG. 11, a carrier sense controller 109 is additionally included.

When a beam gain estimator 105 determines that SDMA is applicable at the access point 1, this carrier sense controller 109 raises the carrier sense level in CSMA of its own station to such an extent that the function of carrier sense is not impaired, thereby the carrier sense sensitivity is suppressed. Note that a circuit for raising or lowering the carrier sense level is known to those skilled in the art.

The timings at which the carrier sense controller 109 sets the carrier sense level are the same as transmitter power control in the first embodiment. That is, the carrier sense controller 109 sets the carrier sense level simultaneously with or instead of the setting of transmitting power in steps S107, S155, and S162 of FIGS. 7, 9, and 10, respectively.

Figure 12:
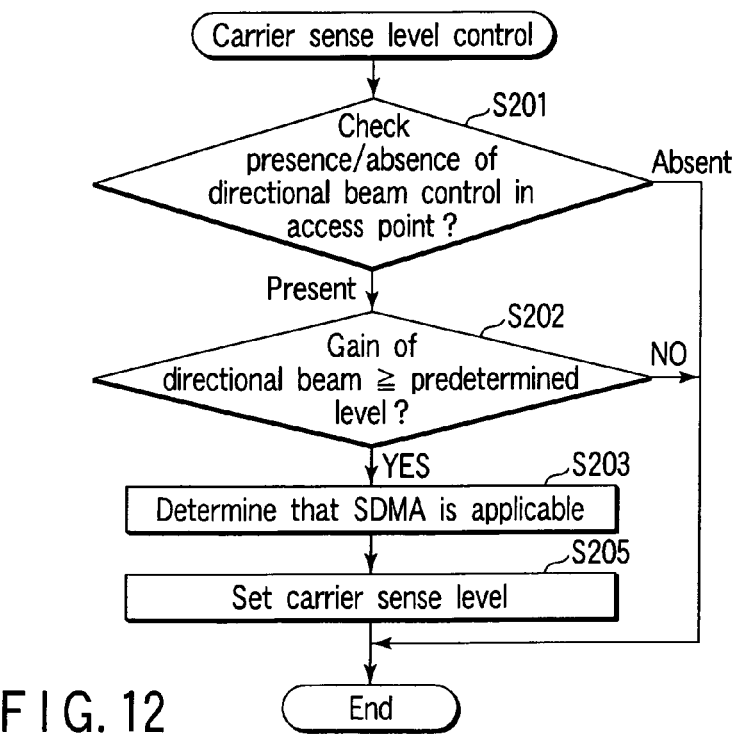
FIG. 12 is a flow chart explaining a carrier sense level control procedure in a wireless station.

FIG. 12 is a flow chart to explain the carrier sense level control procedure. Note that the same reference numerals as in FIG. 8 denote the same processes in FIG. 12, and different processes will be explained.

As explained with reference to FIG. 8, in steps S106, S154, and S161 in FIGS. 7, 9, and 10, respectively, the beam gain estimator 105 checks whether the access point 1 is performing directional beam control, from received power when data transmitted by broadcast by the access point 1 is received and transmitting power information corresponding to the received data, and from received power when data transmitted by unicast by the access point 1 and transmitting power information corresponding to the received data. If determining that the access point 1 is performing directional beam control, the beam gain estimator 105 further checks whether the directivity of the access point 1 is narrowed enough to perform SDMA. For example, if the level of a gain of a directional beam is equal to or higher than a predetermined level, the beam gain estimator 105 determines that SDMA is applicable at the access point 1 (steps S201 through S203). As in the first embodiment, the determination processes from steps S202 through S203 can also be omitted. When this is the case, if the beam gain estimator 105 determines that the access point 1 is performing directional beam control at step S201, the flow advances to step S205 by skipping steps S202 through S203.

If in step S203 the beam gain estimator 105 determines that SDMA is applicable at the access point 1, the carrier sense controller 109 raises the carrier sense level of its own station by a predetermined level, thereby the sensitivity of carrier sense is suppressed (step S205). After that, carrier sense is performed using this newly set carrier sense level.

In the second embodiment as described above, the station (STA) 4-i checks whether the access point 1 is performing directional beam control, from received power when data transmitted by broadcast by the access point 1 is received and from received power when data transmitted by unicast by the access point station 1 is received (if determining that the access point 1 is performing directional beam control, the station (STA) 4-i further checks whether the directivity is narrowed enough at the access point 1 to perform SDMA). If determining that the access point 1 is performing directional beam control (such that the directivity is narrowed enough to perform SDMA), the station (STA) 4-i raises its carrier sense level to suppress the carrier sense sensitivity to the acceptable level. This reduces the possibility that, during carrier sensing thereafter, the station (STA) 4-i senses a wireless wave which another station (STA) 4-j (when i=1, then j=2 or 3) near this station (STA) 4-i transmits to communicate with the access point 1. Accordingly, the station (STA) 4-i starts transmission by regarding that the other station (STA) 4-j is absent. So, no NAV (Network Allocation Vector) defined in IEEE802.11 is set (if this NAV is set, a station does not access the access point 1 for an interval designated by the NAV). In addition, the access point 1 need not to transmit the same data with those transmitted to the respective station (STA) 4-i (i=1 through 3) to other stations (STAs) 4-j (j=1 through 3) by separate directional beam. This means the access point 1 needs not to have other stations (STAs) 4-j (j=1 through 3) set NAV. Note that i and j given to distinguish stations are exclusive. For example, if i=1, then j=2 and 3.

Therefore, the access point 1 can perform SDMA with these stations (STAs) 4-i (i=1 through 3). This increases the number of multiple connections compared to the case where the station (STA) 4-i does not perform the transmitter power control described above.

Note that, as shown in FIG. 11, the station (STA) 4-i may have both the carrier sense controller 109 and the transmitting power controller 106 described earlier to control both the carrier sense level and the transmitting power or control either of them. Either configuration does not depart from the scope of the present invention.

Note also that the station (STA) 4-i may only have either the carrier sense controller 109 or the transmitting power controller 106.

Third Embodiment

IEEE802.11 defines an access control method called RTS (Request To Send)/CTS (Clear To Send). This method ensures the transmission right by using the MAC control frames. This RTS/CTS control uses an RTS frame and a CTS frame and their frame formats are different from the one for a data frame shown in FIG. 5A. Both RTS and CTS frames consists of only MAC header and FCS. The MAC header of RTS consists of frame control field F1, duration field, RA, and TA. As for CTS, the MAC header consists of frame control field F1, duration field, and RA. Whether the RTS frame or CTS frame is used can be checked from the type field F1a and the subtype field F1b in the frame control field F1 of the MAC header.

This RTS/CTS control method is also applicable to the wireless communication system shown in FIG. 1. In this case, when receiving an RTS frame from a station (STA) 4-i, a wireless access point 1 transmits a CTS frame as a response to the station (STA) 4-i by using a directional beam directed to this station (STA) 4-i. By using this feature, as in the first and second embodiments described above, the station (STA) 4-i controls the transmitting power and/or the carrier sense level from the received power of the received beacon frame and from the received power of the received CTS frame.

The rest is substantially the same as the aforementioned first and second embodiments, so the third embodiment will be briefly described below.

A station (STA) 4-i (e.g., a station (STA) 4-1) in which a transmission request is generated transmits an RTS frame to the access point 1. If transmitting power is set previously by a transmitting power controller 106 and is available, the station (STA) 4-1 transmits the RTS frame to the access point 1 by that transmitting power. If not, the RTS frame can be transmitted by a predetermined default transmitting power.

The access point 1 receives the RTS frame and, on the basis of the received power and the like, sets a directional beam to be directed to the station (STA) 4-1. That is, the access point 1 sets the aforementioned weighting factor corresponding to the direction in which the station (STA) 4-1 exists.

By using this directional beam, the access point 1 transmits a CTS frame to the station (STA) 4-1. This CTS frame may contain transmitted power information similar to the authentication frame as described above.

If a received data type detector 103 determines that the data received via an antenna 100 is a CTS frame, the received power of this frame measured by a received power measurement unit 102 and transmitted power information extracted from the frame by a transmitted power detector 104 or pre-stored transmitted power information at a transmitted power detector 104 corresponding to the CTS frame are input to a beam gain estimator 105. This is possible when the access point does not set the directional beam or when the directional angle of the first directional beam is (relatively widely) pre-determined and known at the station.

By using the received power and transmitted power information of the CTS frame and the received power and transmitted power information of the received beacon frame obtained in, e.g., step S102 of FIG. 7, the beam gain estimator 105 and the transmitting power controller 106 perform processing as shown in FIG. 8, thereby the transmitting power is set.

Or alternatively, the beam gain estimator 105 and the transmitting power controller 106 set the carrier sense level by performing processing as shown in FIG. 12.

In the above explanation, the station (STA) 4-i transmits an RTS frame to the access point 1. However, the access point 1 may also transmit an RTS frame to the station (STA) 4-i.

Transmission of an RTS frame from the access point 1 to the station (STA) 4-i will be described.

In this case, if the access point 1 has received frame data transmitted from the station (STA) 4-i as a communication partner, the access point 1 transmits an RTS frame by setting a directional beam to be directed to this station (STA) 4-i on the basis of the received power of the previously received frame data.

By using this feature, therefore, as in the first and second embodiments, the station (STA) 4-i can control the transmitting power and/or the carrier sense level from the received power of the received beacon frame and from the received power of the received RTS frame.

That is, if the received data type detector 103 determines that the data received via the antenna 100 is an RTS frame, the received power of this frame measured by the received power measurement unit 102 and the transmitted power information extracted from the frame by the transmitted power detector 104 or the prestored transmitted power information at the transmitted power detector 104 corresponding to the RTS frame are input to the beam gain estimator 105. As described above, this is possible when the access point does not set the directional beam or when the directional angle of the first directional beam is (relatively widely) predetermined and known at the station.

By using the received power of the RTS frame and the received power of the received beacon frame obtained in, e.g., step S102 of FIG. 7, the beam gain estimator 105 and the transmitting power controller 106 perform processing as shown in FIG. 8, thereby the transmitting power is set.

At the same time, the beam gain estimator 105 and the transmitting power controller 106 may set the carrier sense level by performing processing as shown in FIG. 12.

It is also possible to set the transmitting power and the carrier sense level simultaneously.

When transmitter power control is performed as described above and a new transmitting power is set at the station (STA) 4-i, the station (STA) 4-i transmits a CTS frame to the access point 1 by using this transmitting power.

When receiving this CTS frame, the access point 1 sets the directional beam to be directed to the station (STA) 4-i and uses this directional beam in communication with this station (STA) 4-i thereafter.

In this manner, the same effects as in the first and second embodiments can also be obtained in this third embodiment.

As explained in the first through third embodiments described above, each of the plural stations (STAs) 4-i controls the transmitting power and/or the carrier sense level for communication with the access point 1. This makes the following communication forms feasible.

That is, in the first through third embodiments, the access point 1 communicates with one station (STA) 4-i by using one directional beam. However, as shown in FIG. 13, the access point 1 may also communicate with plural stations (in FIG. 13, stations (STA) 4-1 and 4-2) by using one directional beam.

For example, if another station (e.g., the station (STA) 4-2) is nearly in the same direction with the station (STA) 4-1 from the access point 1, the access point 1 allocates a directional beam 3-4 both to the station (STA) 4-1 and 4-2. In this case, the stations (STAs) 4-1 and 4-2 to which one directional beam 3-4 is allocated by the access point 1 acquire access right by CSMA/CA.

Figure 13:
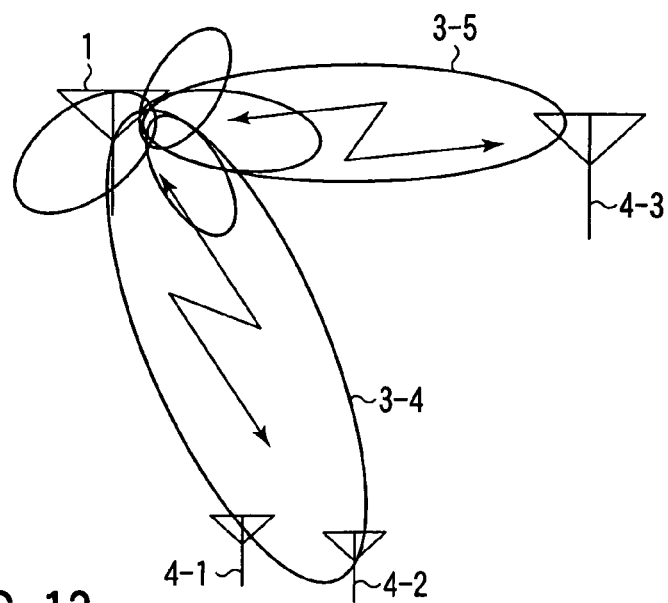
FIG. 13 is a view explaining a case in which an access point 1 communicates with plural stations by one directional beam.

Even when the form as shown in FIG. 13 is applied, each of the plural stations (STAs) 4-i can control the transmitting power and/or the carrier sense level for communication with the access point 1. Consequently, it is possible to reduce interference from the stations (STAs) 4-1 and 4-2 to the station (STA) 4-3 to which a directional beam 3-5 different from the directional beam 3-4 is allocated by the access point 1, and to reduce interference to the stations (STAs) 4-1 and 4-2 from a signal transmitted from the access point 1 to the station (STA) 4-3 to which the directional beam 3-5 is allocated. This allows the access point 1 to perform SDMA to plural stations (STAs) 4-i. Also, this increases the number of multiple connections compared to the case where the station (STA) 4-i does not control the transmitting power and/or the carrier sense level.

Additionally, the wireless communication system explained in each of the first through third embodiments is configured by one BSS which comprises the access point (AP) 1 as an access point and the wireless stations (STAs) 4-1 through 4-3 as plural wireless clients to be connected to the access point 1. However, the present invention is also applicable to a wireless communication system in which, as shown in FIG. 14, plural access points (e.g., two access points 1-1 and 1-2) exist and configure plural BSSs (e.g., two BSSs which are the first and the second BSSs shown in FIG. 14).

Figure 14:
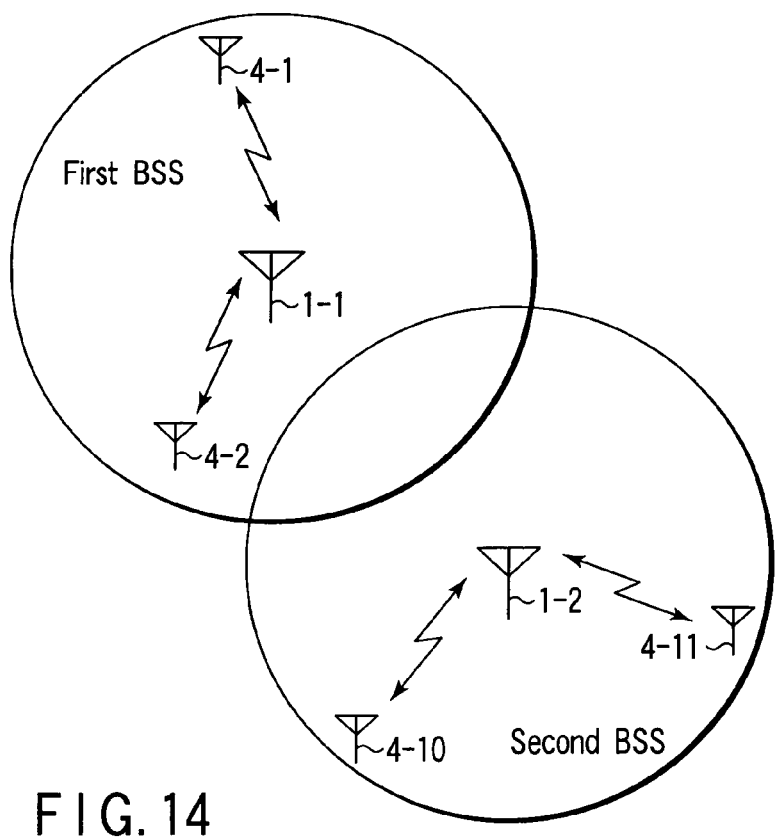
FIG. 14 is a schematic view showing the arrangement of a wireless communication system consisting of plural BSSs (Basic Service Sets).

Even in a system like this, each of the plural stations (STAs) 4-i (e.g., stations (STAs) 4-1, 4-2, 4-10, and 4-11 in FIG. 14) can control its transmitting power and/or the carrier sense level for communication with the access point 1-1 or the access point 1-2. This allows the access point 1 to perform SDMA to plural stations (STAs) 4-i. Also, this increases the number of multiple connections compared to the case where the station (STA) 4-i does not control the transmitting power and/or the carrier sense level.

Note that in principle the station (STA) 4-i can receive a beacon frame in any of the reception mode (step S2), authentication process (step S4), association process (step S5), communication mode (step S6), disassociation process (step S7), and deauthentication process (step S8) shown in FIG. 6. Therefore, if this station (STA) 4-i has received a (unicast) frame transmitted after receiving a beacon frame, transmitting power control and carrier sense level control shown in FIGS. 8 and 12 can be performed at any time.

The present invention is not limited to the above-mentioned embodiments and can be variously modified when practiced without departing from the scope of the invention. Also, the individual embodiments can be appropriately combined as much as possible when practiced. In this case, the effect of combination can be obtained. Furthermore, each embodiment includes inventions in various stages, so a variety of inventions can be extracted by properly combining plural constituent features disclosed. For example, if an invention is extracted by omitting some of the constituent features from the entire disclosed in the embodiments, these omitted portions are complemented by appropriate well-known prior art when this extracted invention is practiced.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A wireless communication system which exchanges data between an access point and plural stations, wherein said station comprises:
   a received data type detection unit which detects whether received data from said access point is a beacon frame;
   a received power measurement unit which measures received power of the beacon frame, and measures received power of data sent from said access point to said station after the beacon frame;
   a beam gain estimation unit which determines the presence/absence of directional beam control in said access point, on the basis of the received powers of the beacon frame and the data measured by said received power measurement unit; and
   a transmitting power control unit which controls transmitting power for transmitting data to said access point, when said beam gain estimation unit determines that said access point is performing directional beam control.

2. A system according to claim 1, wherein the data is an authentication frame from the access point.

3. A system according to claim 1, wherein the data is an association response frame from the access point.

4. A system according to claim 1, wherein when said beam gain estimation unit determines that said access point is performing directional beam control, said transmitting power control unit sets the transmitting power to transmit data to said access point at the minimum necessary power receivable by said access point.

5. A system according to claim 1, wherein when determining that said access point is performing directional beam control, said beam gain estimation unit further checks whether space division multiple access is applicable at said access point, and
   when said beam gain estimation unit determines that said access point is performing directional beam control, and that space division multiple access is applicable at said access point, said transmitting power control unit sets the transmitting power to transmit data to said access point at the minimum necessary power receivable by said access point.

6. A system according to claim 1, further comprising:
   a transmitted power detection unit which detects transmitted power when said access point transmits a first data, and detects transmitted power when said access point transmits a second data.

7. A wireless communication system which exchanges data between an access point and plural stations by CSMA (Carrier Sense Multiple Access), wherein said station comprises:
   a received data type detection unit which detects whether received data from said access point is a beacon frame;
   a received power measurement unit which measures the received power of the beacon frame, and measures the received power of data sent from said access point to said station after the beacon frame;
   a beam gain estimation unit which determines the presence/absence of directional beam control in said access point, on the basis of the received powers of the beacon frame and the data measured by said received power measurement unit;
   a transmitting power control unit which controls transmitting power to transmit data to said access point, when said beam gain estimation unit determines that said access point is performing directional beam control; and
   a carrier sense control unit which controls the carrier sense level of said station in accordance with the result of the determination by said beam gain estimation unit.

8. A system according to claim 7, wherein the data is an authentication frame from the access point.

9. A system according to claim 7, wherein the data is an association response frame from the access point.

10. A system according to claim 7, wherein when said beam gain estimation unit determines that said access point is performing directional beam control, said carrier sense control unit raises the carrier sense level of said station to such an extent that the carrier sense function does not degrade.

11. A system according to claim 7, wherein
    when determining that said access point is performing directional beam control, said beam gain estimation unit further checks whether space division multiple access is applicable at said access point, and
    when said beam gain estimation unit determines that said access point is performing directional beam control, and that space division multiple access is applicable at said access point, said carrier sense control unit raises the carrier sense level of said station to such an extent that the carrier sense function does not degrade.

12. A system according to claim 7, further comprising:
    a transmitted power detection unit which detects transmitted power when said access point transmits a first data, and detects transmitted power when said access point transmits a second data.

13. A wireless station which exchanges data with an access point, comprising:
    a received data type detection unit which detects whether received data from said access point is a beacon frame;
    a received power measurement unit which measures the received power of the beacon frame, and measures the received power of the data sent from said access point to said station after the beacon frame;
    a beam gain estimation unit which determines the presence/absence of directional beam control in said access point, on the basis of the received powers of the beacon frame and the data measured by said received power measurement unit; and
    a transmitting power control unit which controls transmitting power for transmitting data to said access point, when said beam gain estimation unit determines that said access point is performing directional beam control.

14. A system according to claim 13, wherein the data is an authentication frame from the access point.

15. A system according to claim 13, wherein the data is an association response frame from the access point.

16. A station according to claim 13, wherein when said beam gain estimation unit determines that said access point is performing directional beam control, said transmitting power control unit sets the transmitting power to transmit data to said access point at the minimum necessary power receivable by said access point.

17. A station according to claim 13, wherein
    when determining that said access point is performing directional beam control, said beam gain estimation unit further checks whether space division multiple access is applicable at said access point, and
    when said beam gain estimation unit determines that said access point is performing directional beam control, and that space division multiple access is applicable at said access point, said transmitting power control unit sets the transmitting power to transmit data to said access point at the minimum necessary power receivable by said access point.

18. A station according to claim 13, further comprising:

a transmitted power detection unit which detects transmitted power when said access point transmits the beacon frame, and detects transmitted power when said access point transmits the data.

19. A wireless station which exchanges data with an access point by CSMA (Carrier Sense Multiple Access), comprising:

a received data type detection unit which detects whether received data from said access point is a beacon frame;

a received power measurement unit which measures the received power of the beacon frame, and measures the received power of data sent from said access point to said station after the beacon frame;

a beam gain estimation unit which determines the presence/absence of directional beam control in said access point, on the basis of the received powers of the beacon frame and the data measured by said received power measurement unit;

a transmitting power control unit which controls transmitting power for transmitting data to said access point, when said beam gain estimation unit determines that said access point is performing directional beam control; and a carrier sense control unit which controls the carrier sense level of said station in accordance with the result of the determination by said beam gain estimation unit.

20. A system according to claim 19, wherein the data is an authentication frame from the access point.

21. A system according to claim 19, wherein the data is an association response frame from the access point.

22. A wireless station according to claim 19, further comprising:

a transmitted power detection unit which detects transmitted power when said access point transmits the beacon frame, and detects transmitted power when said access point transmits a second data.

* * * * *

UNITED STATES PATENT AND TRADEMARK OFFICE
CERTIFICATE OF CORRECTION

| | | |
|---|---|---|
| PATENT NO. | : 7,565,162 B2 | Page 1 of 1 |
| APPLICATION NO. | : 11/257042 | |
| DATED | : July 21, 2009 | |
| INVENTOR(S) | : Adachi et al. | |

It is certified that error appears in the above-identified patent and that said Letters Patent is hereby corrected as shown below:

On the title page, the Terminal Disclaimer information has been omitted. Item (45) and the Notice information should read as follows:

--(45) Date of Patent: *Jul. 21, 2009

(*) Notice: Subject to any disclaimer, the term of this patent is extended or adjusted under 35 U.S.C. 154(b) by 564 days.

This patent is subject to a terminal disclaimer.--

Signed and Sealed this
Ninth Day of August, 2011

David J. Kappos
*Director of the United States Patent and Trademark Office*